Oct. 4, 1966  J. A. STARK  3,276,116
TOOL CHANGER
Filed Jan. 31, 1961  12 Sheets-Sheet 2
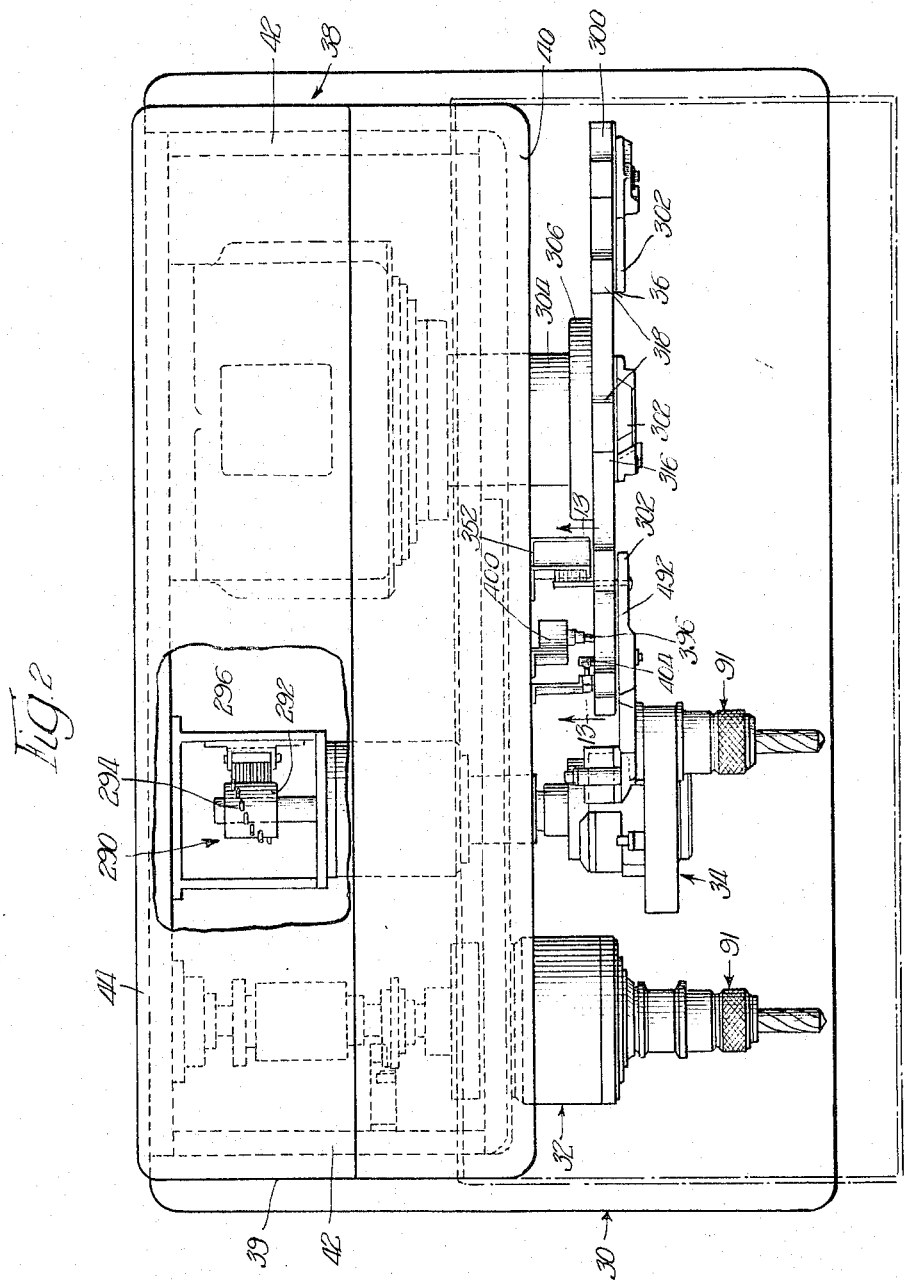
INVENTOR.
James A. Stark.
BY
Byron, Hume, Groen & Clement
Attys Oct. 4, 1966 J. A. STARK 3,276,116
TOOL CHANGER
Filed Jan. 31, 1961 12 Sheets-Sheet 3
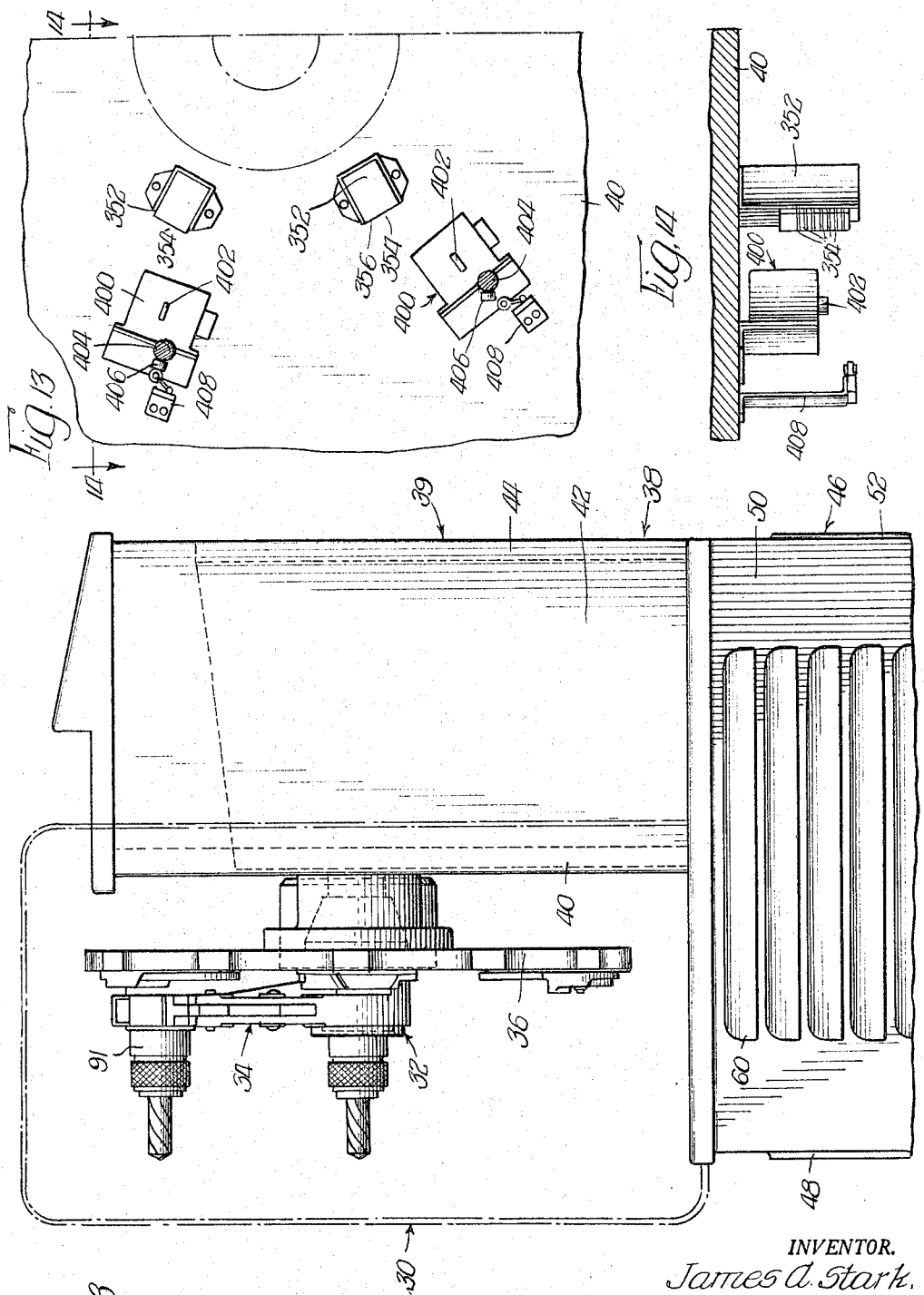
INVENTOR.
James A. Stark.
BY
Byron, Hume, Groen + Clement.
Attys.

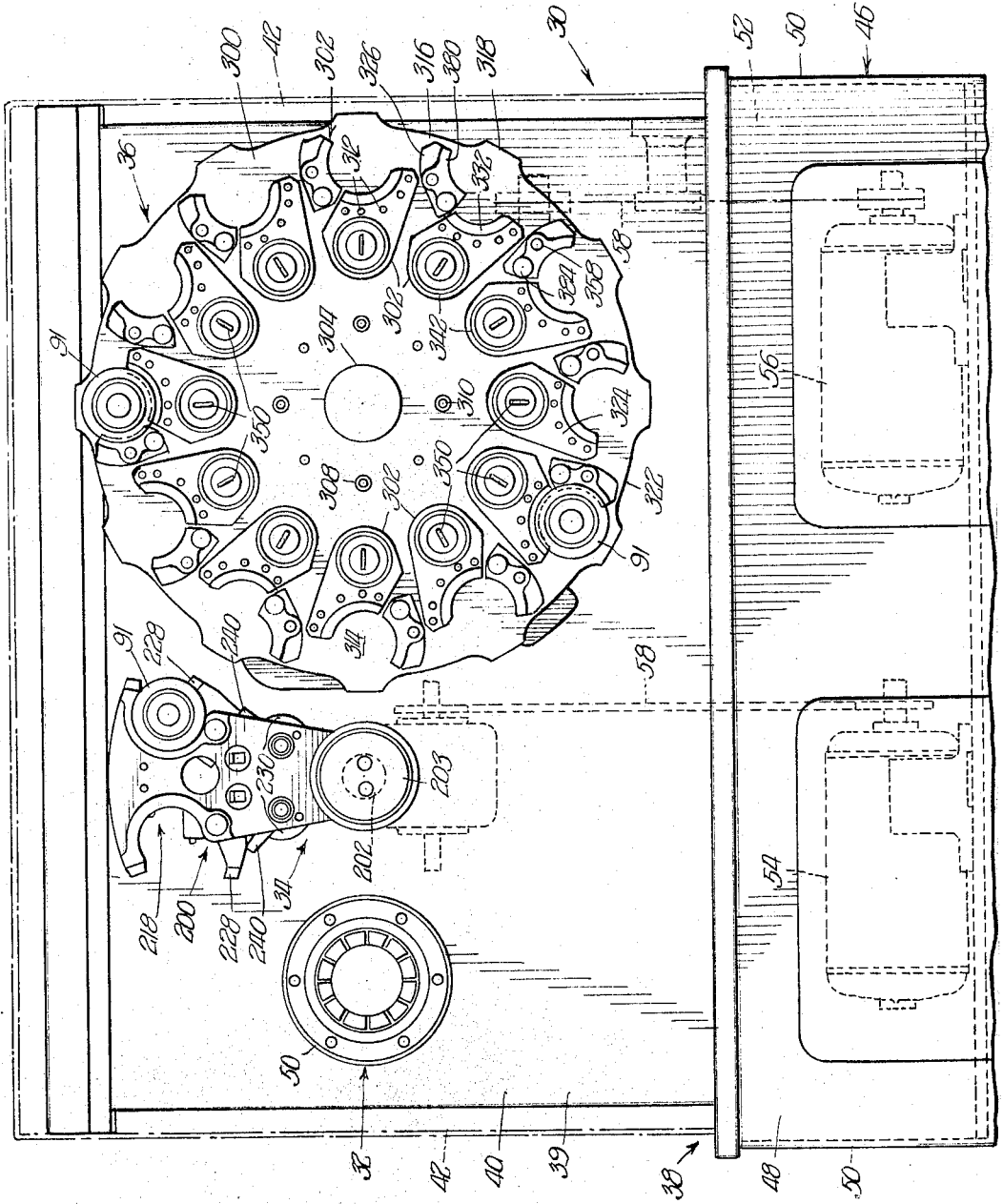

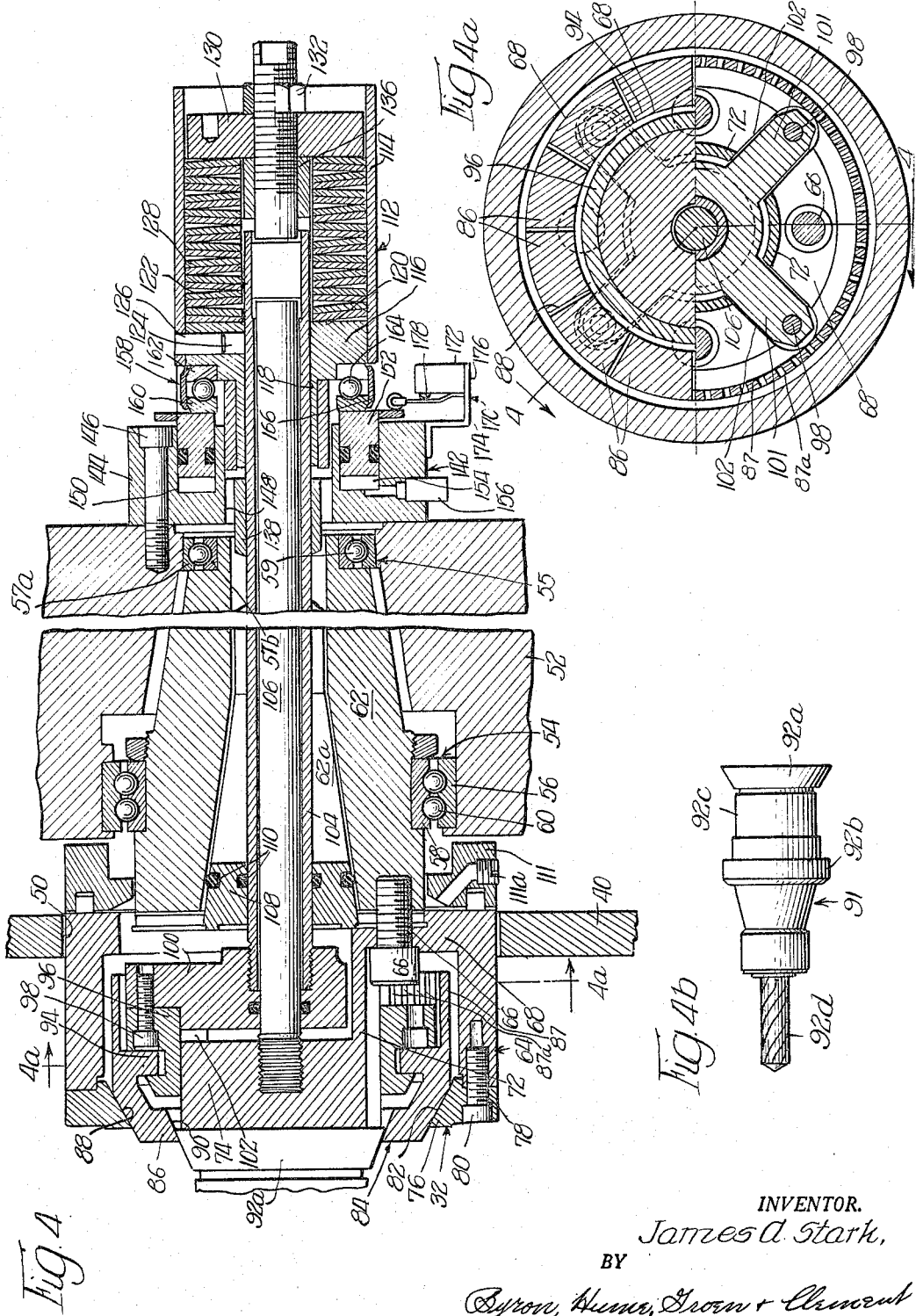

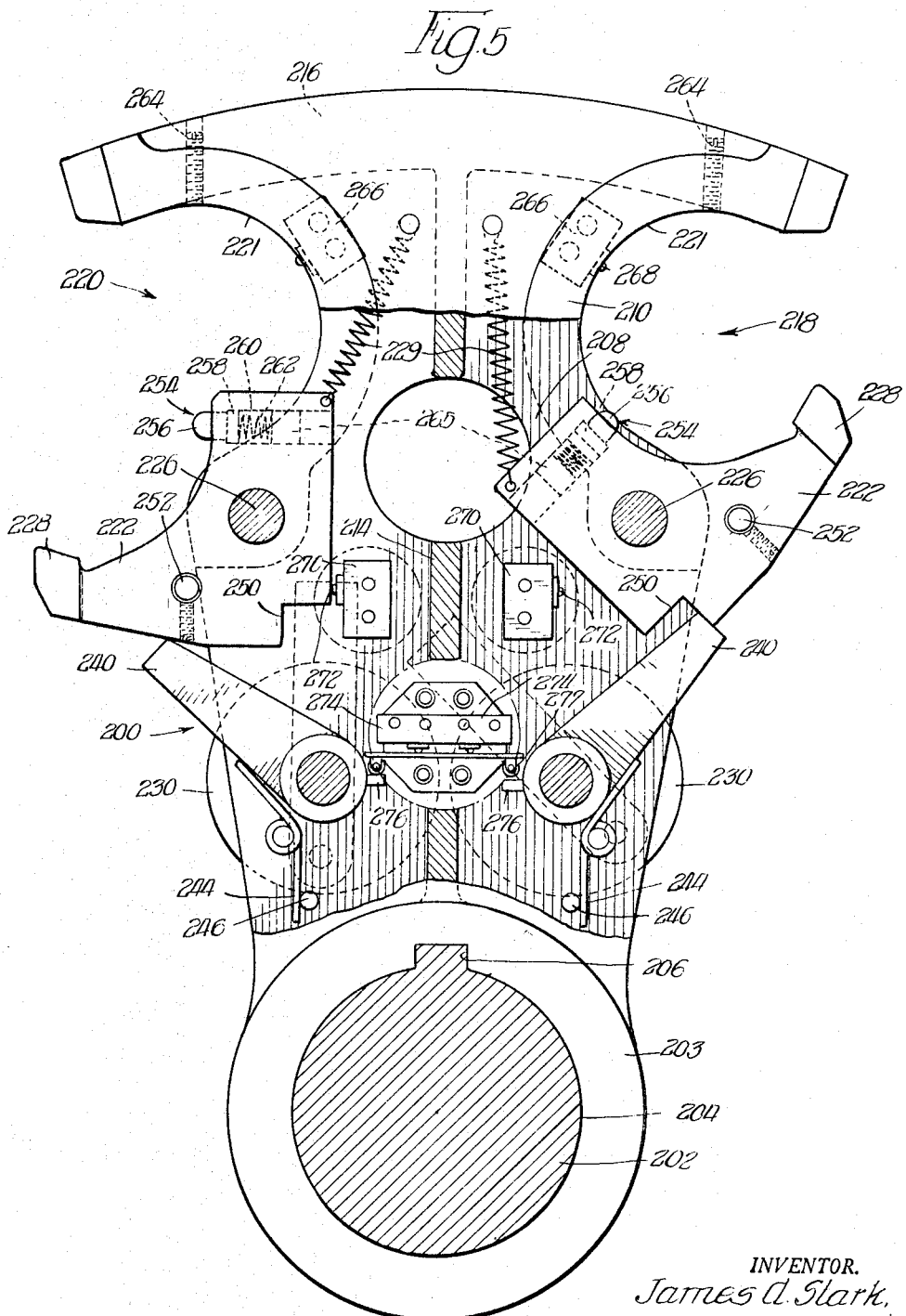

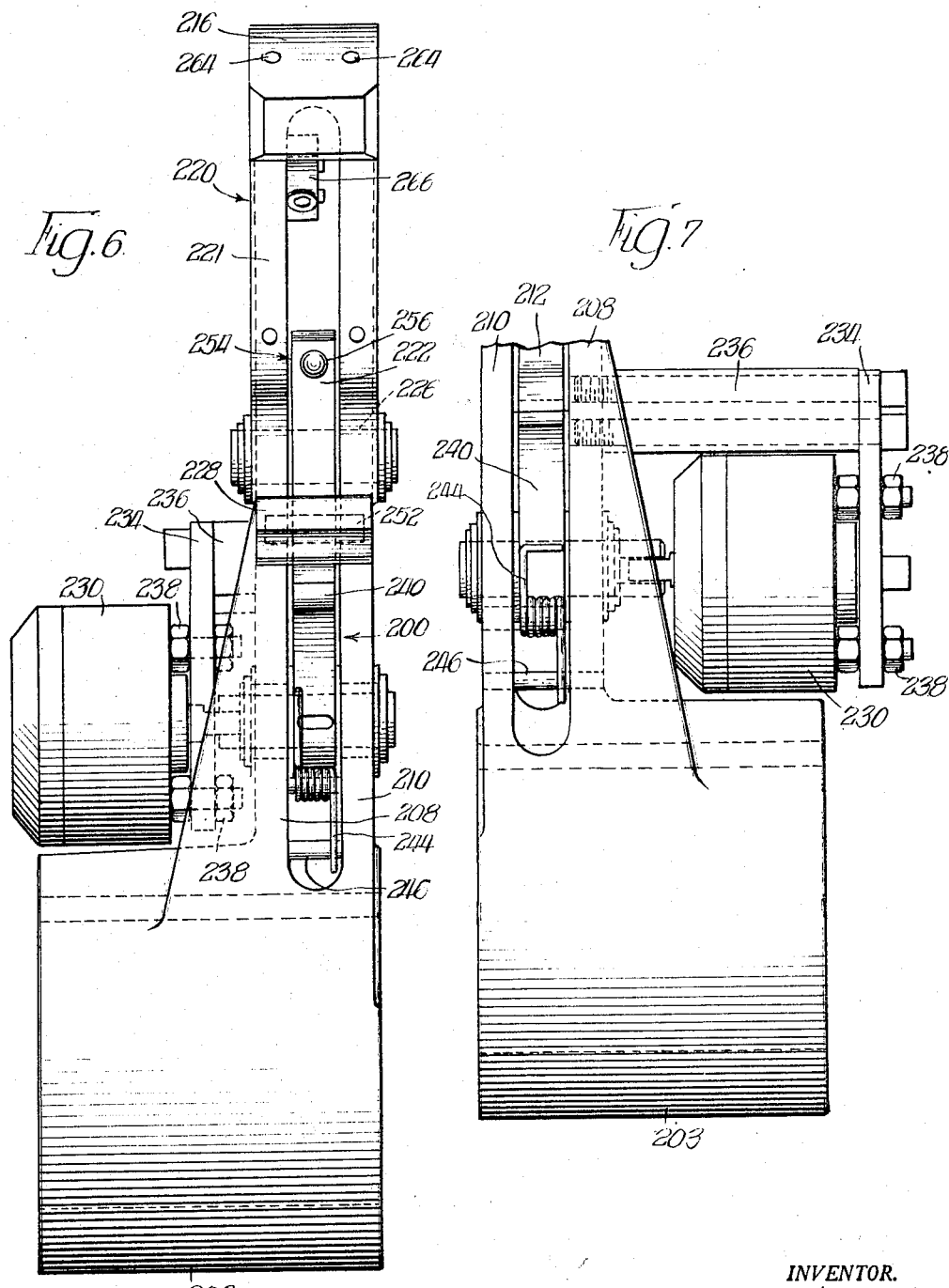

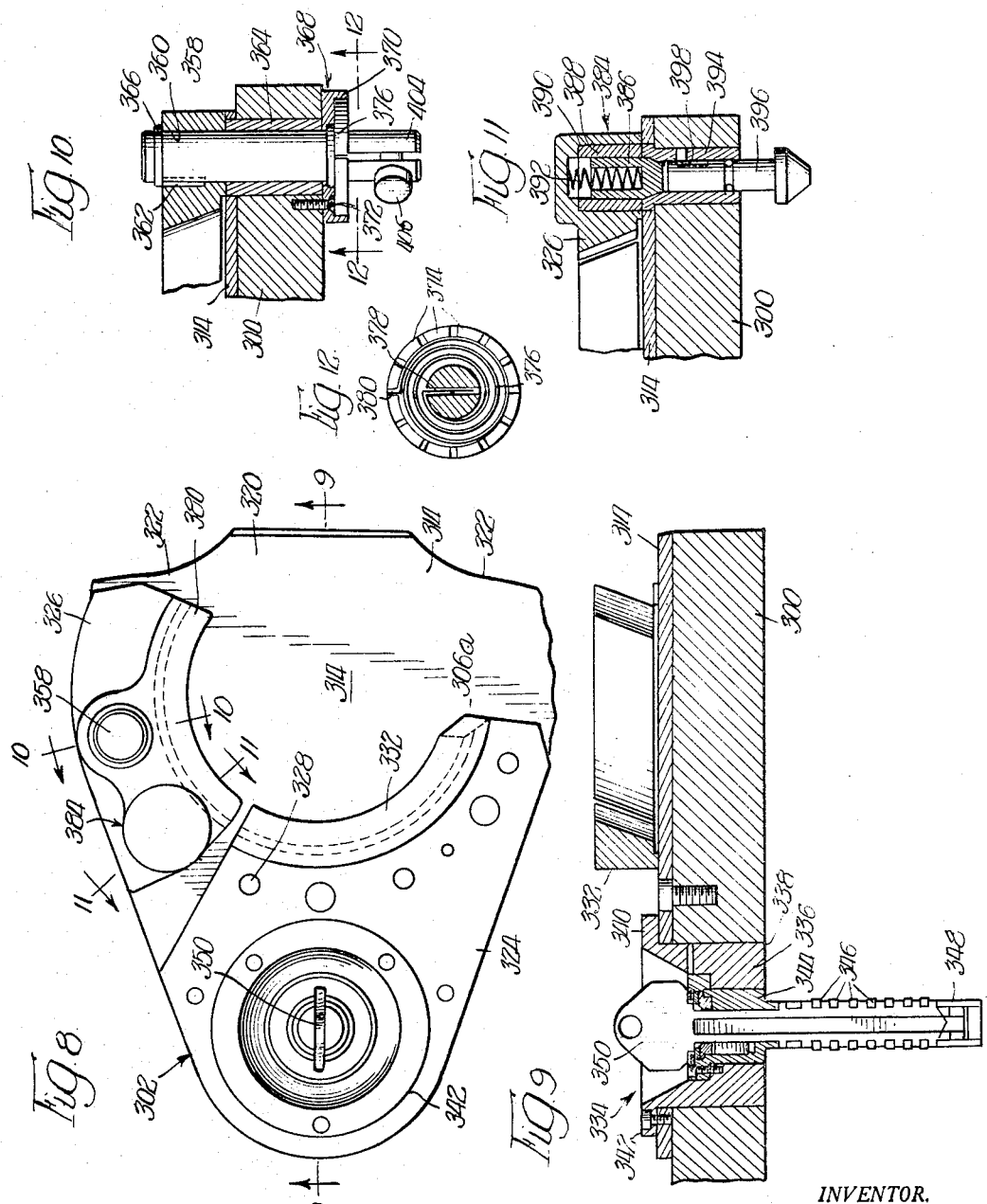

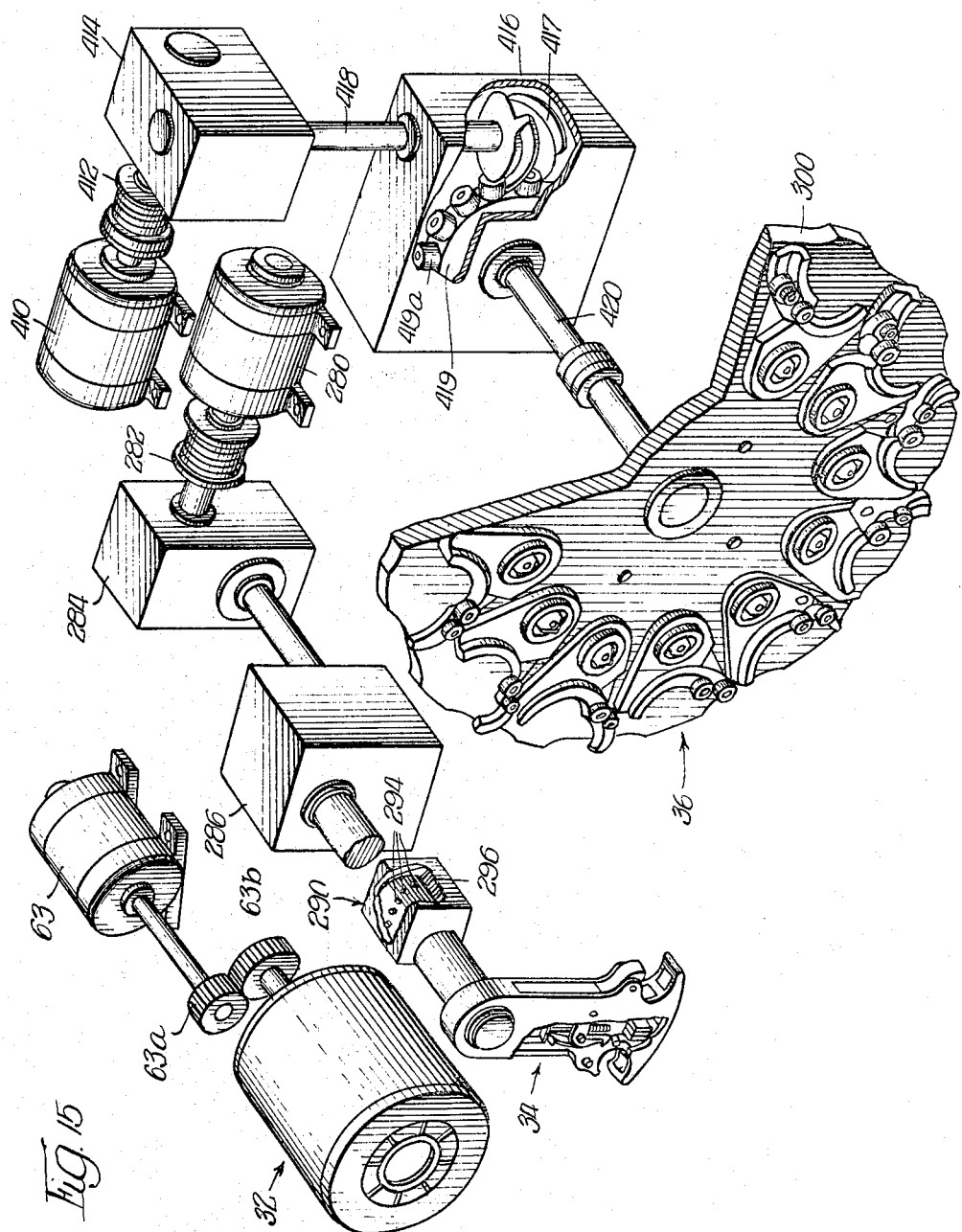

Oct. 4, 1966　　　　　　　　　J. A. STARK　　　　　　　　3,276,116
TOOL CHANGER
Filed Jan. 31, 1961　　　　　　　　　　　　　　　　　12 Sheets-Sheet 9
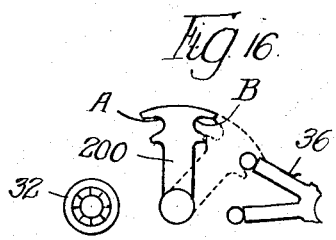
Fig. 16
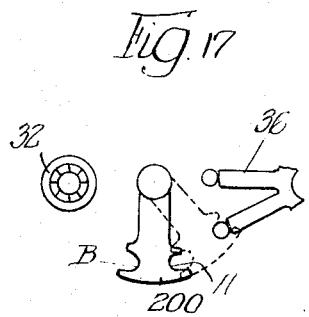
Fig. 17
Fig. 18
| STEP | POSITION | Ⓐ | Ⓑ | CHUCK | MATRIX | |
|---|---|---|---|---|---|---|
| 0 | 1 | 0 | 0 | X | INDEX | STARTING SITUATION |
| 1 | 6 | X | | 0 | | |
| 2 | 1 | | | | | READY |
| 3 | 2 | X | | 0 | | |
| 4 | 3 | | 0 | X | | |
| 5 | 4 | | | | INDEX | FROM MEMORY |
| 6 | 5 | 0 | | X | | |
| 7 | 4 | | | | | FINISH SITUATION |
C.C.W. CYCLE
| STEP | POSITION | Ⓐ | Ⓑ | CHUCK | MATRIX |
|---|---|---|---|---|---|
| 0 | 4 | 0 | 0 | X | INDEX |
| 1 | 5 | X | | | |
| 2 | 4 | | | | |
| 3 | 3 | | X | 0 | |
| 4 | 2 | 0 | | X | |
| 5 | 1 | | | | INDEX |
| 6 | 6 | | 0 | | |
| 7 | 1 | | | | |
C.W. CYCLE
X = CLOSED
O = OPEN
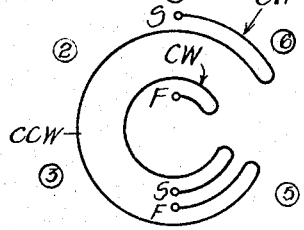
Fig. 19
C.W.- CLOCKWISE
C.C.W. COUNTERCLOCKWISE
S - START
F - FINISH
INVENTOR.
James A. Stark,
BY
Byron, Hume, Groen + Clement
Attys.

Oct. 4, 1966    J. A. STARK    3,276,116
TOOL CHANGER
Filed Jan. 31, 1961    12 Sheets-Sheet 10
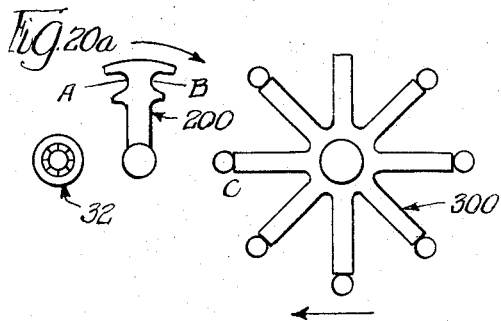
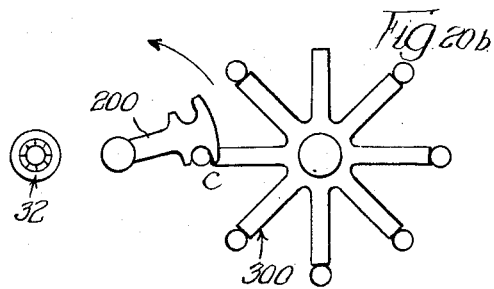
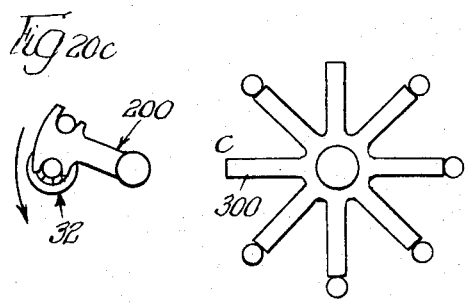
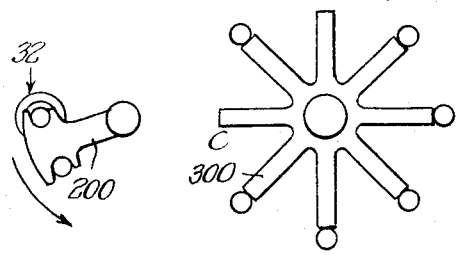
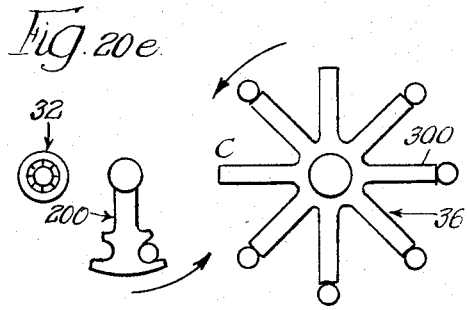
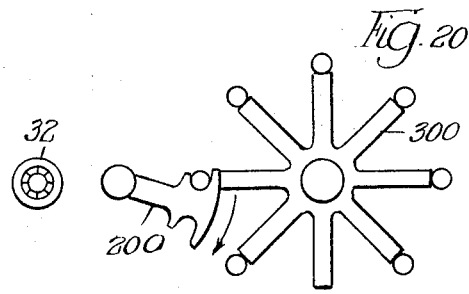
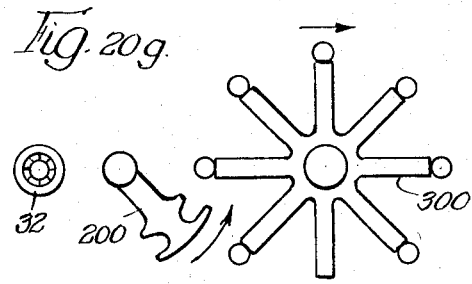
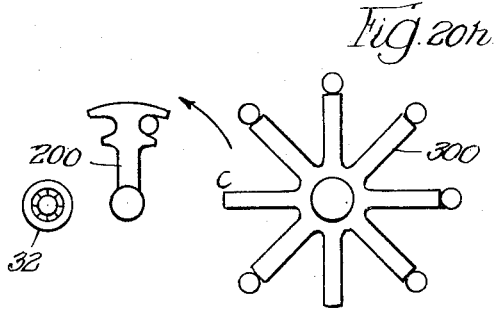
INVENTOR.
James A. Stark,
BY
Byron, Hume, Groen & Clement
ATTYS

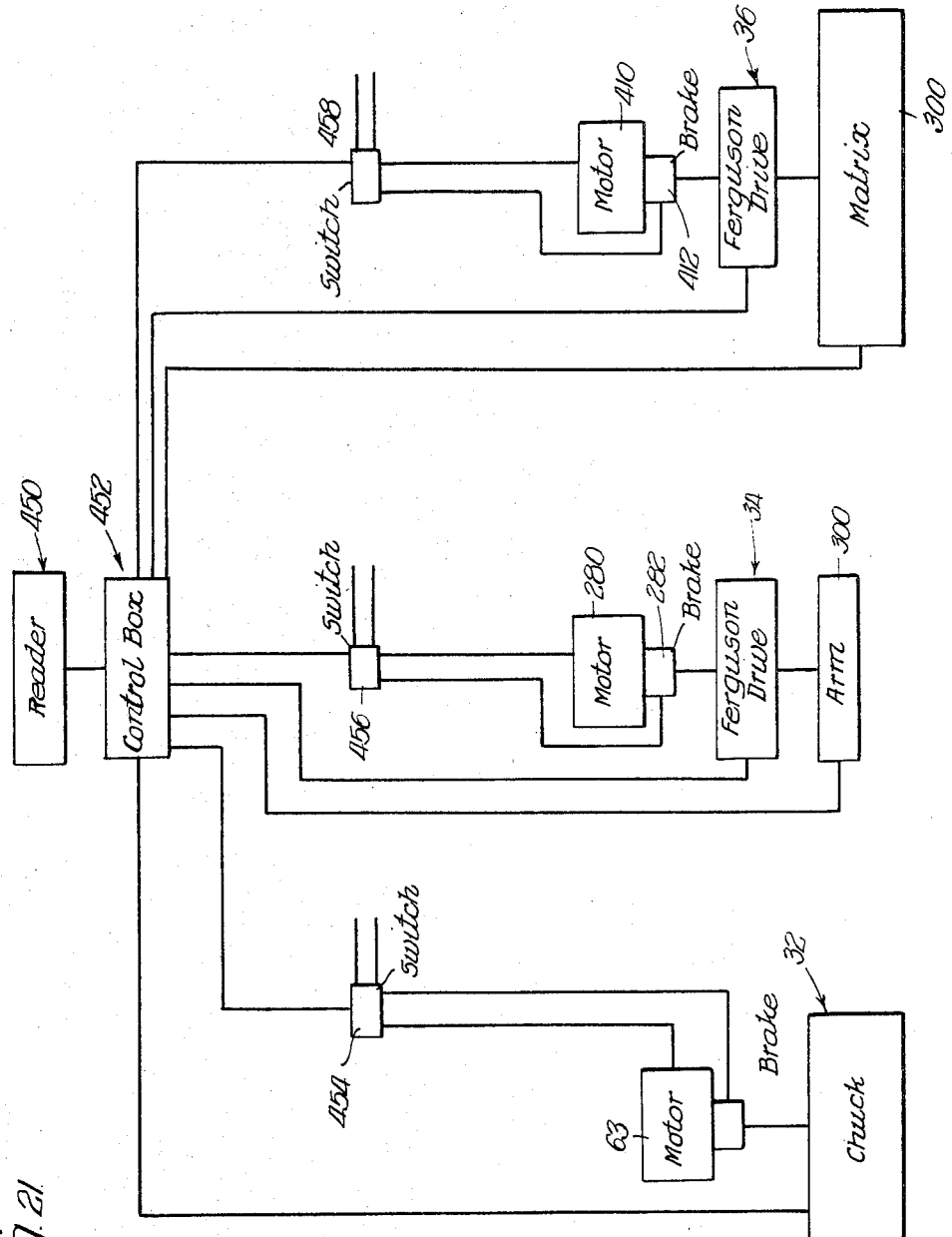

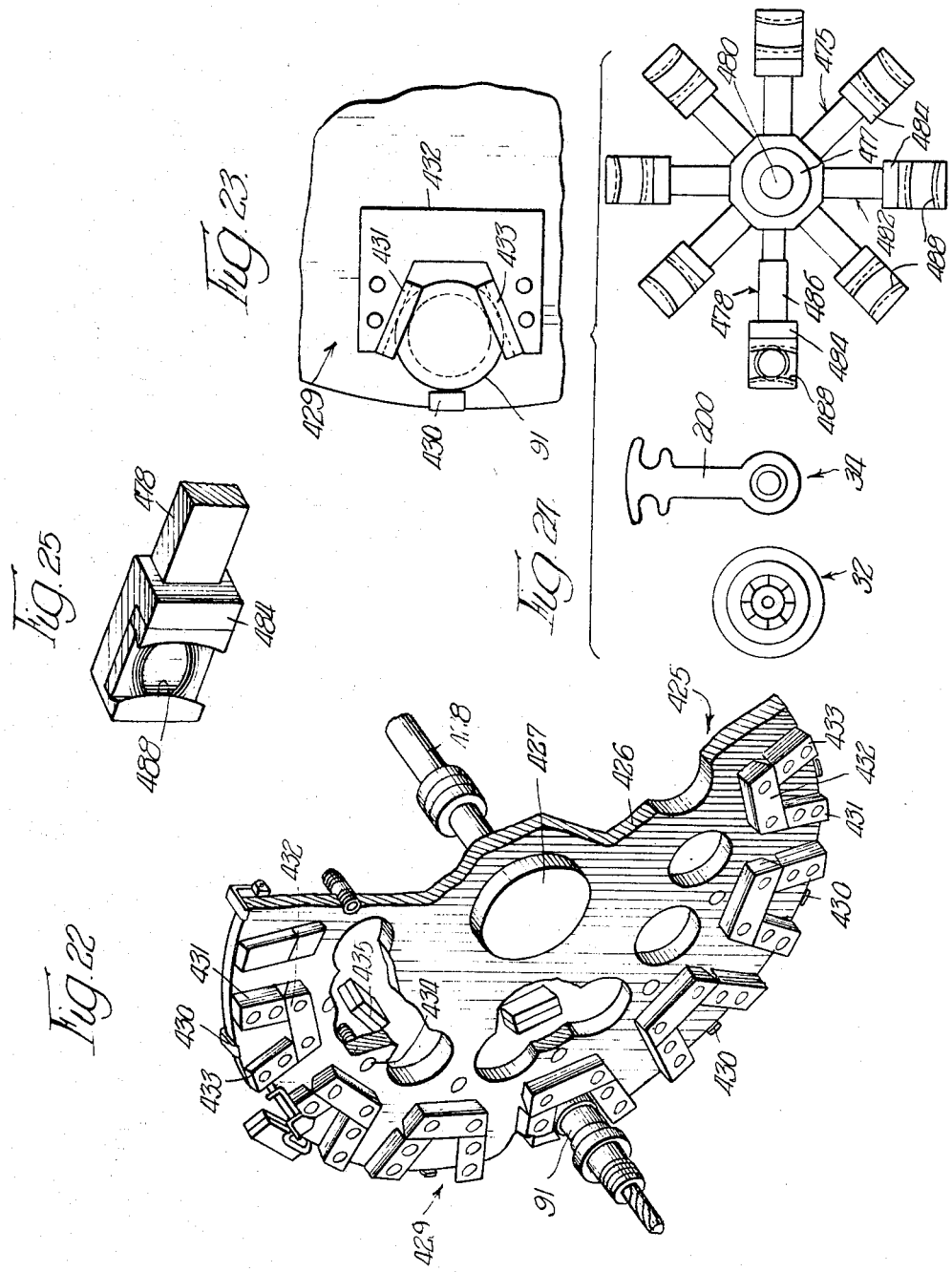

3,276,116
TOOL CHANGER
James A. Stark, 4816 Central Ave., Western Springs, Ill.
Filed Jan. 31, 1961, Ser. No. 86,148
10 Claims. (Cl. 29—568)

This invention pertains to a machine tool and specifically, to a machine tool having an improved system for automatically interchanging various types of tools between a storage means and a tool driving means.

During the past few years, considerable advances have been made toward developing a machine tool that could utilize a large number of tools of various types in which the tools may be automatically interchanged substantially without manual assistance. The purpose of such a machine is to permit the performance of a series of operations upon a part in a single machine. In one form the machine is directed by a data storage device, such as a punched tape or card which is read by a scanner. The scanner, in turn, directs by proper circuitry signals in accord with the data storage device to the various components of the machine tool. The ultimate in such a machine is the ability to carry out the entire machining operation of a given part without having to change the part to a different machine, or to manually re-position the part or to manually interchange the tools which are used on the machine, with a minimum of idle time for effecting the interchange.

For purposes of this application the terminology "machine tool" means only those components necessary to effect the interchange of tools used in the machining operation. Broadly, such components include a means for driving a tool, means for storing a plurality of tools and means for transferring the tools between the first two means. It will be obvious that in a completed machine tool that certain other components and accessories will be necessary for carrying out the machining operation. These components and accessories, however, do not form a part of this invention and are not necessary to an understanding of the same and accordingly, will not be described herein.

For purposes of convenience, hereinafter, the portion of the system used for storing the tools shall be designated as a matrix, the component for mounting and driving the tool shall be designated as a chuck, and the component for interchanging the tools shall be designated as the transfer mechanism. These designations are not to be considered as limiting but are merely for purposes of convenience. It will be further understood that the tool may include a fixture or jig for aiding in securing it to the chuck, as will be described hereinafter. Specifically, the fixture standardizes the ends that are received in the various components of the system so as to facilitate the handling of the tool. An example of a fixture, hereinafter called tool holder, is disclosed and claimed in my co-pending application Serial No. 43,097, filed July 15, 1960, now Patent No. 3,171,663.

One of the problems encountered in the construction and design of such a machine tool is the interchanging of the tool between the matrix and the tool chuck. Heretofore, the interchanging of tools has been carried out in a series of planes. As a result it is necessary to drive either the transfer mechanism or the chuck or both in an axial direction with respect to the other, as well as in a translatory direction between the chuck and the matrix. While the multiple plane type of interchange may be satisfactory in some instances, it requires a relatively complicated apparatus and is time-consuming. One of the reasons for the multiple plane transfer is the construction of the matrix and the chuck. These devices as designed heretofore have required the axial insertion of the tool.

The invention consists, at least in part, of a combination of a matrix for storing the tools, a transfer mechanism, and a tool driving means. These units are arranged and constructed so that the interchange of tools between the matrix and the chuck may be effected in a single plane. As a result of the single plane interchange, it is possible to eliminate the complicated constructions heretofore necessitated in the prior art machines.

Another aspect of the invention resides in the transfer of the tools between the matrix and the chuck. In essence the method comprises holding the tools in the matrix in a fixed plane which is common with the tool receiving end of the chuck and maintaining said tools in such plane during the transfer between the matrix and chuck.

Still another part of the invention lies in the transfer mechanism, which is constructed so as to eliminate the time-consuming aspects of the prior art tool changers. In essence, the transfer mechanism consists of an arm pivotally mounted at one end and adapted to rotate in a single plane about the pivot. The arm is provided with a first and second tool carrying means, which are arranged in circumferentially opposing relationship. As a result of this construction, it is possible for the arm to pick up a tool from the chuck and deposit a new tool in the chuck in a single rotary movement, and then continue toward the matrix to deposit the old tool therein. Thus, it is possible to effect the interchange of tools within the matter of a few seconds. Heretofore, it was necessary for the transfer arm to pick up the old tool from the chuck, carry it back to the matrix, and deposit the same in the latter. Then the matrix and the arm had to be rotated until the desired new tool was presented, so that the latter could pick up the tool. The transfer mechanism was then rotated back into alignment with the chuck, so that the tool could be deposited in the latter. It is obvious that the multiple pass, multiple plane operation of the prior art devices would require a far more complicated mechanism for effecting the same and a much greater length of time for carrying out the transfer operation than would a single-pass operation, possible with the subject invention in which the transfer is carried out in a single plane.

Another feature of the invention resides in the construction of the matrix and particularly the design and arrangement of the tool holding devices. In essence, the matrix includes a substantially circular rotatably mounted disc to which is secured a plurality of circumferentially spaced tool storing devices. The latter is constructed so that the tool may enter and leave along an arcuate path rather than a linear path which lies in a chordal or radial relationship to the disc.

One of the foremost objects of the subject invention resides in the provision of a machine tool which is capable of automatically carrying out a plurality of machining operations. In essence, the machine tool comprises a chuck for driving a tool, a matrix for storing a plurality of tools of various types, and a transfer mechanism for selecting a tool from the matrix and transferring it to the chuck.

Another object of the invention resides in the provision of a machine tool in which a plurality of tools of various types are stored in a matrix, and which may be selectively transferred from the matrix to a chuck. The interchange of tools is effected by predetermined signals from a data storage device or the like.

A further object of the invention resides in the provision of a machine tool in which the transfer of a tool from the matrix to a chuck is effected in a single plane.

A further object of the invention resides in the provision of a machine tool in which the transfer mechanism effects the interchange of tools at the chuck in substantially a single operation.

A still further object of the invention resides in the provision of a machine tool in which the matrix is constructed so as to permit the transfer of tools along an arcuate path.

A still further object of the invention resides in the provision of a machine tool in which the interchange of tools may be carried out in a minimum of time. More specifically, the machine tool is designed so that the proper tool for the succeeding operation is preselected during the preceding machining operation so that a transfer may be effected without need of indexing the matrix while the chuck is idle. In this manner the chuck idle time during the interchange is minimized.

These and other objects will be apparent upon reading of the specification, with reference to the following drawings.

In the drawings:

FIGURES 1, 2 and 3 are front, plan, and side views in elevation of the machine tool embodying the invention.

FIGURE 4 is a view taken in cross section of one form of the chuck that may be used in the practice of the invention.

FIGURE 4(a) is a sectional view taken along the lines 4a—4a in FIGURE 4.

FIGURE 4(b) is a view in elevation of the tool and tool holder that may be used in the practice of the invention.

FIGURE 5 is a view partly in elevation, partly in section, of the arm of the transfer mechanism embodying the invention.

FIGURES 6 and 7 are fragmentary side views of the arm.

FIGURE 8 is a view in elevation of a tool-holding cartridge used in the construction of the matrix.

FIGURE 9 is a sectional view taken along the lines 9—9 in FIGURE 8.

FIGURE 10 is a sectional view taken along the lines 10—10 in FIGURE 8.

FIGURE 11 is a sectional view taken along the lines 11—11 in FIGURE 8.

FIGURE 12 is a sectional view taken along the lines 12—12 in FIGURE 10.

FIGURE 13 is a fragmentary view of the mounting panel immediately behind the matrix showing the components in operative association with the latter, taken along the lines 13—13 in FIGURE 2.

FIGURE 14 is a sectional view taken along the lines 14—14 in FIGURE 13.

FIGURE 15 is an exploded view in perspective showing a schematic arrangement of the mechanical components used in the construction of the machine tool.

FIGURES 16 and 17 are diagrammatic illustrations of one form of operation of the machine tool.

FIGURE 18 is a chart showing the condition of the various elements of the machine tool as different stages of the operation.

FIGURE 19 is a diagrammatic illustration of the path of travel of a transfer mechanism in a modification of the tool changer system.

FIGURES 20(a) through 20(h) are diagrammatic illustrations of the operation of a second form of the machine tool.

FIGURE 21 is a schematic illustration of the electrical circuitry of the tool changer system.

FIGURE 22 is a fragmentary perspective view of a modification of the matrix.

FIGURE 23 is a fragmentary view in elevation of a tool holding assembly used in the modification shown in FIGURE 22.

FIGURE 24 is a schematic view of still another modification of the matrix.

FIGURE 25 is a fragmentary perspective view of a tool holding assembly from the matrix in FIGURE 24.

It will be understood that the various components and elements utilized in the practice of the invention may be constructed of any suitable material that have the properties and characteristics necessary for the particular element. It will also be understood that the particular designs of any of the elements disclosed herein are merely for purposes of example and are not to be considered as limitations, except where designated otherwise.

Referring now to the FIGURES 1, 2 and 3, there are shown elevational views of the machine tool embodying the invention, generally denoted by the numeral 30. Broadly, the machine tool 30 consists of a chuck 32, a tool transfer mechanism 34 and a matrix 36 for storing a plurality of tools of various types. These three components are mounted on a supporting construction 38 of some suitable type.

In this particular instance, the supporting construction 38 is comprised of an upper housing portion 39 which includes the forward wall 40, the side panels 42 and the rearward wall 44. The forward wall 40 is provided with suitable apertures for receiving the spindles on which the components are mounted as will be more specifically described hereinafter. The upper housing 39 is mounted on a lower housing portion 46 which, in this particular instance, comprises the forward wall 48, side panels 50, and rearward wall 52. The lower housing 46 provides space for mounting the electric motors 53a and 53b which are used for driving the transfer mechanism 34 and matrix 36, respectively. In the illustration shown in FIGURE 1, the motors are connected to their respective components by means of the chains 58, however, other kinds of mechanical connections such as belts, gears, and the like may be utilized. The side panels 50 of the lower housing 46 may be provided with louvres 51, which permit the ingress and egress of air from the housing for purposes of cooling the motors 53a and 53b. It will be apparent that other types of supporting constructions may be utilized in the practice of the invention, and that the one shown in the drawings and described herein is merely exemplary.

For example, the respective components may be mounted on separate supporting structures and may be movable relative to each other for purposes of performing the machining operation or for convenience and space-saving.

The specific constructions of each of the major components used in the construction of the machine tool and the operation thereof will be discussed hereinafter.

*Tool chuck*

Referring now to FIGURE 4, there is shown one example of a tool chuck that may be used in the practice of the invention. Reference is made to the co-pending application of James A. Stark, filed July 15, 1960, bearing Serial No. 43,097, entitled Machine Tool. In the co-pending application, a chuck embodying substantially the same concepts as the one illustrated in FIGURE 4, although of a slightly modified construction, is disclosed and claimed.

The chuck 32 has the principal feature of eliminating the necessity for inserting the tool, or the holder in which it is mounted, into a collet, as is required in the prior art devices of this type. The tool need merely be brought into coaxial alignment with the chuck and in closely spaced relationship with the forward face thereof, so that upon actuation of the chuck, the tool is grasped in a manner suitable for driving.

As mentioned previously, the chuck extends through an aperture 50 in the forward wall 40 and is supported by means of a suitable support 52, which is mounted within the cabinet 38. The support member 52 is provided with the bearings 54 and 55 for rotatably supporting the chuck 32. The bearing 54 comprises the spaced inner and outer race members 56 and 58 and a plurality of ball-type anti-friction members 60 disposed therebetween. The inner race member 58 is secured to a spindle 62 which in turn is driven by the motor 63 (FIGURE 15)

through the gears 63a and 63b. It should be noted that the gear drive shown in FIGURE 15 is merely a schematic illustration of one exemplary form and that any other suitable type of drive means might be used. The bearing 55 is composed of the spaced inner and outer race members 57a and 57b with the anti-friction members 59 disposed therebetween.

The spindle 62 is secured to an outer sleeve 64 by means of a plurality of regularly spaced bolts 66. The sleeve 64 is provided with a plurality of inwardly extending flange members 68, having the apertures 70 for receiving the bolts 66. A plurality of annularly spaced members 72 depend forwardly from the flange members 68 and are connected at their forward end to the plate 74.

An annular ring 76 is secured to the forward end of the sleeve 64 by means of the bolts 80 which are received within the threaded apertures 78. The inner surface 82 of the ring 76 comprises a conical taper or frustrum which converges toward the forward end of the chuck. For purposes of reference, the taper is designated as having an angle of inclination of $\beta$ with respect to the axis of the chuck.

A collect 84 is positioned within the sleeve 64. As can be seen in FIGURE 4a, the collet 84 for the forward portion of its length comprises a plurality of annularly spaced fingers 86, which are separated by the slots 88. The fingers 86 are cantilevered springs which may be flexed so that the collet may be radially contracted or expanded. When the collet 84 is radially contracted so as to grasp a tool and then released, the fingers will naturally return to their normal positions due to their spring characteristics. The rear portion of the collet 84 is comprised of a plurality of annularly spaced fingers 87 and spaces 87a, which are much narrower than the fingers 86. The operation of the chuck is described in detail in the aforementioned co-pending application.

The forward end of the collet, and specifically, the fingers 86 are provided with the tapered surfaces 88, which are substantially complementary to the surface 82, in that they are inclined at the angle $\beta$ with respect to the axis of the chuck. On the inner surfaces of the fingers 86, there is a second series of tapered surfaces 90, which converge toward the forward end of the chuck. The tapered surfaces 90 are inclined at the angle $\alpha$ with respect to the axis of the chuck. The surfaces 90 are adapted to receive a complementary tapered end of a tool holder 91. As a result of the aforementioned collet construction and its association with the annular ring 76 the fingers 86 may be caused to radially contract by the forward extension of the collet to grasp a tool holder 91, as will be seen later on.

Referring to FIGURE 4(b) it can be seen that the tool holder 91 includes the frusto-conical end 92a and the cylindrical portion 92b having the annularly recessed portion 92c. The tool holder 91 further includes some means (not shown) for receiving and locking a tool 92d against relative rotary movement. As a result of this arrangement the shape and size of the portion of the tool to be held by the chuck, matrix or transfer mechanism, may be standardized so that the various tools can be readily interchanged. As will be seen later on the tool holder is held in the matrix 36 by the conical end 92a and is grasped by the transfer mechanism 34 at the annular groove 92b.

In the aforementioned co-pending application a detailed description is given of the relationship between the angles $\alpha$ and $\beta$. Briefly, the angle $\beta$ is several degrees larger than the angle $\alpha$ in order for the collet to grasp a tool holder. The greater the difference between the angles $\beta$ and $\alpha$, the greater the rate of change of the projected point of convergence of the tapered surfaces 90 toward the face of the chuck or toward a grasping position onto the tool holder 91. In the preferred embodiment the angle $\alpha$ will be within the non-locking range so that when the fingers 86 are forced inwardly to grasp a tool holder 91, the latter will be forced rearwardly into seating position onto the plate 74. In that manner, the tool holder 91 is properly seated so as to maintain concentricity. At the same time, the angle $\beta$ may also be within the non-locking range so that the collet can be readily retracted to release the tool holder. If the difference between the two angles is within the locking range, then once the collet is extended, it will remain so without a positive force maintaining it there. Normally, the locking range for a metal-on-metal relationship falls within zero to ten degrees. It has been found that one preferred embodiment includes an angle $\beta$ of 30 degrees, and $\alpha$ of 24 degrees, resulting in a difference of six degrees. In that construction the collet 84 will be of a locking variety, since the difference is within the locking range and will provide a reasonable rate of convergence relative to the linear extension.

As was mentioned previously, the collet 84 is caused to contract by moving it forwardly with respect to the annular member 76. The movement of the collet 84 and the construction for effecting the same, will now be described. The collet 84 is provided with the inwardly extending flange 94 which is slidably received in the annular member 96. The annular member 96 is in turn connected by a plurality of bolts 98 to a spider 100 comprising the four arms 101 which extend through the spaces 102 between the members 72. The spider 100 is in turn connected to the actuator tube 104, which is mounted on the shaft 106, and is adapted for limited reciprocation thereon.

The actuator tube 104 is supported intermediate its ends by the annular member 108, which is disposed within the spindle cavity 62a. The annular member 108 is provided with suitable sealing rings 110 so as to provide sealing engagement with the spindle 62 and the actuator tube 104 to prevent the ingress of dirt and foreign material into the spindle cavity 62a and the components of the chuck comprising the drive and actuating mechanisms. The chuck is further provided with the annular shield 111 which is in sealing engagement with the sleeve 64. The shield 111 is provided with the air hose fitting 111a through which a blast of air may be directed for purposes of clearing the chuck components forward of the spindle 62 of foreign material such as shavings and the like.

The rear end of the actuator tube 104 is threadedly secured to the spring housing assembly generally denoted by the numeral 112. The spring housing assembly 112 includes the outer cylinder member 114 which is secured to the shaft extension member 116 by welding or the like. The shaft extension member 116 is provided with the internal bore 118 and includes the threaded portion 120 which engages a complementary threaded portion 122 on the actuator tube. The shaft extension member 116 is locked in place by the copper plug 124 which is forced against the threads 122 by means of a set screw 126.

A plurality of Bellville type spring washers 128 are mounted within the cylinder 114 in a back-to-back relationship, and are confined against the shaft extension member 116 by means of a stop member 130 which is threadedly secured to the shaft 106. The stop member 130 is spaced from the member 114, so as to permit reciprocation of the latter and the tube 104 as will be described later on. A stop sleeve 136 is threadably secured onto the shaft 106 and is positioned in abutting relationship with the stop member 130 so as to limit rearward movement of the actuator tube 104 relative to shaft 106. A second stop sleeve 138 is fixedly mounted in sliding relationship on the actuator tube 104 in alignment with the forward end of the shaft extension member 116 so as to limit forward movement of the actuator tube.

The spring washers 128 force the sleeve member 114 and the shaft extension member 116 toward the left. The latter in turn forces the actuating tube 104 in the same direction so as to cause the collet 84 to move toward the extended position. It will be noted that in FIGURE 4 the collet 84 is shown in a partially extended position so that the shaft extension member 116 is intermediate both stop members 136 and 138.

The collet is forced into its retracted position by the motor assembly generally denoted by the numeral 142. The motor assembly 142 comprises the annular cylinder 144, which is secured by means of the bolts 146 to the housing 52. The cylinder 144 is provided with the aperture 148, which embraces the actuating tube 104, shaft extension member 116, and the bushing 138 in a spaced relationship so as to permit rotation of the latter components relative thereto. The cylinder member 144 is provided with the annular recess 150 which slidably receives the annular piston 152 so as to define the chamber 154. A duct 156 extends through the cylinder 144 communicating with the chamber 154 for the purposes of supplying a pressurized fluid, either gas or liquid, to the latter. The piston 152 is connected with the shaft extension member 116 by means of the thrust bearing 158. The thrust bearing 158 is composed of two spaced annular race members 160 and 162, between which are disposed a plurality of anti-friction roller members 164. A shield 166 extends between the race members 160 and 162 to prevent foreign material from falling into the space between the race members and interfering with the operation of the bearing. The bearing 158 permits the motor assembly 142 to be held stationary by the housing 52, while the spring housing assembly is permitted to rotate with the actuating tube 104 and the shaft 106.

When it is desired to retract the collet, pressurized fluid is supplied to the chamber 154 so as to force the piston 152 toward the right against the thrust bearing 158 and the shaft extension member 116. The shaft extension member 116 in turn compresses the spring washers 128 against the stop member 130. When the shaft extension member 116 moves toward the right, it carries with it the actuating tube 104 and in turn the collet 84 by means of the spider connection 100. After the tool used in the completed operation is removed, and a new tool has been placed in the proper position with respect to the collet, the pressure is exhausted from the chamber 154, so that the spring washers 128 are free to return to their expanded position, to the limit permitted by the stop member 138. As a result of this arrangement, the chuck is normally in its extended position as a result of the action of the spring washers 128.

It will be apparent that the relationship between the motor assembly 142 and the spring washers 128 may be reversed. Specifically, the motor assembly 142 may be utilized for maintaining the chuck in the extended position and the washers for retracting the collet to its retracted position. It is also apparent that other kinds of actuating devices may be used for operating the chuck.

It can now be seen that the tool holder 91 need merely be "wiped" in closely spaced relationship across the face of the chuck when the collet 84 is in its retracted position until its axis is in substantial alignment with the axis of the chuck. At this point the fluid pressure in the chamber 154 may then be exhausted so that the collet 84 is forced into its extended position so as to grasp the tool holder 91. This construction eliminates the necessity of inserting the tool holder into the collet as is required in the prior art devices.

In order to indicate the position of the chuck to the controller utilized in the operation of the machine tool, a signaling device 170 is assembled to the piston 152. The signaling device 170 comprises a micro-switch 172 of conventional construction that is mounted on a bracket 174 extending from the cylinder 144. A switching arm 176 is secured at one end to the bracket 174 and abuts at the other end on the piston 152. Intermediate its ends, switching arm 176 is adapted to depress the actuating button 178 on the micro switch 172, when the piston 152 is in its extended position to indicate that the chuck is open. When the piston 152 is contracted, the arm is moved out of contact with the button 178 so as to deenergize the switch 172. In this manner it is possible to indicate to the control device whether the chuck is in its extended position or in its retracted position.

*Transfer mechanism*

Referring now to FIGURES 1, 5, 6 and 7, there is shown a transfer mechanism 34 for transferring the tools between the matrix and the chuck. The transfer mechanism includes a rotatably mounted arm 200 which is mounted between the matrix and the chuck and which is adapted to be rotated between the two by suitable driving means, to be discussed later on.

At the rotatably mounted end of the arm 200 it is provided with the hub 203 having the aperture 204 which is adapted to receive the drive shaft 200. The aperture 204 is provided with the key-way slot 206 for preventing relative movement between the arm 200 and the shaft 202. Above the hub 203 the arm 200 is comprised of two spaced plates 208 and 210 which define the space 212 therebetween as best shown in FIGURES 6 and 7. The spaced plates 208 and 210 are secured together by means of the rib 214 which extends between the hub 203 and the upper end of the arm. At their upper ends the plates 208 and 210 are bridged by means of a cross member 216.

In FIGURE 5 the plate 210 has been broken away so as to disclose the elements used in the construction of the arm. Adjacent the upper end of the arm are positioned the tool carrying assemblies 218 and 220 arranged in opposing relationship. Since the assemblies are substantially identical in construction only the one designated 218 will be described to avoid repetition with like parts being designated with like numbers.

The assembly 218 includes an arcuate recess 221 extending through both plates 208 and 210 of sufficient size to embrace the tool holder 91 in the groove 92c. Moreover, the groove 92c is of substantially the same length as the distance between the outer surfaces of the plates 208 and 210 at the recess 221 and in this manner accurately position the tool holder 91 for transfer to the chuck 32 or the matrix 36. The assembly 218 is provided with a pivoted jaw member 222 which is pivotally mounted between the plates 208 and 210 by means of the pin 226 as can be seen in FIGURE 6. The free end of the jaw member 222 is provided with the boss 228 which is adapted to abut a tool holder 91 positioned within the recess 222 when closed. It will be noted that the jaw member 222 associated with the assembly 218 is in the closed position, whereas the jaw member associated with the assembly 220 is in its opened position.

The jaw member 222 is biased toward its open position by a coil spring 229 connected at one end to a fixed point on the plate 208 and at the other end to the jaw member at a point spaced from the pivot pin 226. As can be seen in FIGURE 5, the point of attachment of the spring 229 is substantially opposite from the boss 228 with respect to the pin 226. In this manner the free end of the jaw is rotated about the pivot pin by means of the spring 229.

The jaw member 222 is moved between its opened and closed positions by means of the solenoid 230. Shown in FIGURES 6 and 7 the solenoid is mounted on the rear surface of the plate 208 by means of a mounting bracket 234 which is secured to the boss 236 by the bolts 238. The solenoid 230 is provided with the rotatable arm 240 which is mounted in the space 212 between the plates 208 and 210. The solenoid is of the rotary type so that actuation of the same causes rotation of the arm 240. The rotation is effected by a ball bearing, helical pitch arrangement (not shown) of a conventional type in which linear motion of the solenoid plunger is translated into rotary motion. The arm 240 is biased by a coil spring 244 having one end in abutting relationship therewith and the other end in contact with a stop member 246. The coil spring 244 tends to force the arm toward a position in which the jaw is in its closed position.

When the solenoid 230 is energized the arm 240 is forced to rotate against the force of the coil spring 244 toward the position that will permit the jaw to open. The movement of the arm permits the jaw to be pivoted about the pin 226 into its open position by means of the coil spring 229. When the solenoid is deenergized the arm is forced to rotate so as to close the jaw. The forced rotation of the arm is effected by the coil spring 244.

When the arm is in its closed position the end thereof is received in the notch 250 in the jaw member 222 so as to lock the latter in the closed position. In this manner the jaw member cannot be inadvertently opened since any force tending to rotate the same about the pivot pin 226 will be transmitted directly to the end of the arm 240. Only when the arm has been rotated out of the closed position may the jaw be opened.

The jaw 222 is provided with a stop pin 252 which is adapted to abut on the plate 210 when in its opened position. In this manner the pivotal movement of the jaw toward the opened position is limited.

The assembly 218 is further provided with the spring biased pin assembly 254 which comprises the pin member 256 having the flanged end 258. The pin member 256 and specifically, the end 258 is slidably received in the aperture 260 so as to confine the coil spring 262 between it and the stop member 265. The coil spring 262 forces the pin member into its extended position as shown in the drawings, which, in turn, acts against a tool holder which may be positioned within the recess 221.

The assembly 218 also includes a pair of set screws 264 which projects slightly beyond the contour of the recess 221. As a result of this arrangement a tool holder 91 when positioned in the assembly 218 is held by the combination composed of the boss 228, set screws 264 and biased pin 256 in which the latter biases the tool holder into an engagement with the other points of suspension.

The assembly 218 is provided with a signal means for indicating to the controller the presence of a tool holder. In essence, the signal means comprise the micro switch 266, which is mounted in the space 212. The micro switch 266 includes an actuating button 268 which projects beyond the periphery of the recess 221 an amount sufficient to be depressed by a tool holder 91 positioned therein. In this manner a signal is generated to indicate the presence of a tool holder.

The arm 200 is also provided with switch means 270 for indicating to the controller the position of the jaw 222. The switch 270 in one preferred form comprises a micro switch having an actuating button 272, which is depressed by the jaw when in its open position. In this manner the position of the jaw is indicated to the controller.

A signal means for indicating the position of the rotary arm 240 is associated with the solenoid 230. The switch is actuated by a radially extending pin 276, which is mounted on the hub of the arm 240. When the arm 240 is in its open position it abuts an actuating lever 277 so as to relay a signal to the controller.

Referring now to FIGURE 15 there is shown a schematic illustration of the drive mechanism for rotating the arm 200. Specifically, the drive mechanism includes a motor 280 of some suitable type, which is coupled to a brake mechanism 282 that is electrically energized. The motor 280 and the brake 282 are wired in a conventional manner so that when the motor 280 is deenergized the brake is actuated so as to prevent any further rotation. The brake is connected to a gear box 284 which reduces the speed to some suitable r.p.m. The gear box 284 may be of a conventional construction and will not be specifically described herein.

The gear box 284 is connected to a Ferguson drive, generally denoted by the numeral 286 and will be described in detail and shown in the drawings with reference to the matrix. The Ferguson drive is characterized as the combination of a worm gear having a variable helical pitch which is engaged by a spur gear having a plurality of teeth. In essence, the variable pitch is characterized as including a first portion of zero pitch, an intermediate or second portion having a positive pitch which increases from zero to some maximum and then decreases back to zero, and a third portion of zero. The number of teeth in the gear are some multiple of the number of stations through which the arm passes during its operation. Assuming that the multiple is one, then a single tooth will be drivingly engaged during the movement of the arm between any two stations and while positioned at one of the stations.

As a result of the variable pitch, it is possible to vary the rotation of the output shaft in accordance therewith. When the gear engages the positive portion of the pitch the rotatioal speed of the output shaft is at a maximum whereas the rotational speed during the zero pitch portion is equal to zero. As a result the rotation of the output shaft is periodical with the zero portion occurring at the stations at which the arm is positioned during the transfer of tool as will be further discussed later on.

The Ferguson drive in turn is connected to an indicating device 290 for signaling the position of the arm 200 at any given instant, as shown in FIGURE 2. The indicating device 290 comprises a drum 292 which is drivingly engaged to the output shaft of the Ferguson drive. A plurality of radially projecting pins 294 are mounted on the drum 292 along a helical path with the pins corresponding to the respective stations through which the arm moves. A plurality of contact members 296 are mounted in closely spaced relationship to the drum 292 to contact the pins 294 as the drum is rotated. As a result of the helical arrangement only one pin is in contact with its respective contact member 296 at any given time. As the drum rotates the pins will engage their respective contact members in succession to indicate the position of the arm 200.

It is to be noted that the construction and operation of the arm, and the matrix for that matter, which will be described hereinafter, is not to be limited to the cyclical movement resulting from the Ferguson drive. It may well be that in some of the instances the arm will be driven in a continuous manner in which the gear box will be connected directly to the arm 200.

*Matrix*

Referring back to FIGURES 1, 2 and 3 there are shown elevational views of the matrix. It can be seen that the matrix 36 includes a large substantially circular disc 300 to which is secured a plurality of tool storing assemblies, generally denoted by the numeral 302. The disc 300 is mounted at its axis on the shaft 304 and is connected by the shaft to means for rotating it, as will be described later on. The shaft 304 is provided with a flanged end 306 having a plurality of apertures which are coincidental with like apertures 308 in the disc 300 for receiving the bolt members 310, which secure the two together.

Each of the tool storing assemblies 302 is provided with a plurality of apertures 312 which are aligned with like apertures in the disc 300 for receiving bolts for securing the two together. Each of the assemblies 302 includes a base plate 314 which is secured directly to the disc 300. The base plate is generally triangular in shape with one of the sides being coincident with a portion of the circumference of the disc 300. It will be noted that the disc 300 is provided with a somewhat scalloped periphery including a plurality of recessed portions 316 and the projecting portions 318. The base plates 314 of the tool storing assemblies 302 include a projecting portion 320 which is adapted to be coincident and coextensive with the projecting portions 318 and the adjacent portions of the recesses 316 of the disc when the tool storing assemblies are mounted on the latter.

Referring now to FIGURE 8 there is shown a single tool storing assembly 302 which is identical to those mounted on the disc 300. The tool storing assembly 302 is provided with a fixed holding segment 324 and a pivoted segment 326. The fixed segment 324 is secured by means of the bolts 328 to the base plate 314, and is provided with the arcuate recess 330 at one end which has a radius of curvature adjacent the base plate 314 substantially equal to the base of the tool holder 91 shown in FIGURE 4. The recess 330 is undercut to form a portion of a conical frustrum which is complementary to base 92a of the tool holder 91. One end of the segment 326 is beveled at 306a to facilitate the entry and removal of the tool holder, as will be explained in greater detail later on.

The fixed segment 324 is provided with the aperture 332 which receives the key assembly, generally denoted by the numeral 334, for identifying the particular tool deposited within the respective tool storing assembly. It is to be noted that the key assembly is merely examplary and that other suitable means may be used for identifying the tool in a particular assembly 302.

The key assembly comprises a collar 336 which is seated within the aperture 332 and the aperture 338 which extends through the disc 300. The collar 336 is provided with the flange 340 which includes a plurality of equally spaced cap screws 342 for securing it to the base plate 314. An insert 344 extends through the collar 336 and is provided with a plurality of spring fingers 346 which project from a frame member 348. A key 350 is received within the frame member 348 and is provided with spaced lugs coincident with some of the fingers for selectively raising them when the key is turned. By cutting the key so as to raise a specific combination of fingers 346 it is possible to identify the particular tool received within the tool storing assembly. As a result of this key assembly if it should be desired to change the particular tool received or positioned within the tool storing assembly it is merely necessary to change the key which is used for identifying the tool.

Referring now to FIGURES 13 and 14 there is shown pick-up means that is used in conjunction with the key assembly 324 for identifying the particular tool within a specific tool storing assembly. The pick-up means is generally denoted by the numeral 352 and is mounted on the forward panel 40 of the supporting structure 30. The pick-up devices 352 project outwardly at right angles from the panel 40 and are mounted behind the disc 300 so as to be in association with the key assemblies 334 as the disc is rotated. Specifically, the pick-up devices 352 are of a conventional construction which include a plurality of spring-like contact members 354 which project from the face 356. The contact members 354 are in a spaced aligned relationship so as to be coincident with the respective fingers on the key assembly 334. The assembly 352 is positioned so that only those fingers which are raised by the key 350 will contact the members 354. The specific combination of fingers 346 in contact with the assembly 352 causes a signal to be generated which identifies the particular tool in the associated tool storing assembly 302. In this manner it is possible to indicate to the actuating system which of the tools is in the particular pick-up position so that it may be transferred by the transfer mechanism 34 to the chuck 32. It will be noted that in the embodiments shown in FIGURE 13 that two of the signaling assemblies 352 are mounted on the wall 40. This relationship is used where the transfer mechanism is adapted to pick up or deposit the tools in the matrix at two points, specifically at two points equally spaced from the horizontal axis of the matrix. It will be noted that in those embodiments where the tools are picked up and deposited at a single point, only a single signaling device 352 will be used in the construction of the matrix 34.

Referring back to FIGURE 8 the pivoted segment 326 is secured to the base plate 14 and the matrix disc 300 by means of the pivot pin 358. The pivot pin 358 extends through the aperture 360 in the segment 326 and is secured to the latter by means of the key and slot arrangement 362. The pivot pin 358 projects through the bushing 364 which is disposed within the disc 300. The upper end of the pivot pin 358 is secured by the snap ring 366 and the other end by the spring collar assembly 368. The spring collar assembly 368 comprises the collar member 370 which is secured to the disc 300 by the cap screws 372. The collar 370 includes a plurality of circumferentially spaced arms 374 in which is positioned the spiral spring 376. The spiral spring 376 is fixed at one end to the pivot pin 358 by means of the tongue and groove arrangement 378. The other end of the spring 376 is fixed between two adjacent arms 374 of the collar 370 by means of the tongue 380. The spring 376 is biased so as to tend to rotate the pivot pin 358 in a direction which would open the pivoted segment 326.

The pivoted segment 326 is provided with the arcuate recess 382 which is undercut in the same manner as the recess 330. When the pivoted segment 326 is in its closed position, the recesses 330 and 380 complement each other so as to circumscribe the greater part of a circle and to embrace the conical base of the tool holder 91. As a result of the undercut of the recesses 330 and 380 the tool holder 91 is locked in place in the axial direction so as to prevent inadvertent displacement. In this manner the tool holders project outwardly at right angles from the disc 300 as shown in FIGURES 1 through 3.

As a result of their unique construction the storage assemblies 302 permit a tool holder to be removed and deposited along the arcuate path followed by the arm 200. As mentioned previously the segment 324 may be chamfered at its end to further facilitate such a transfer, particularly when the tool holder is moving in a generally parallel direction with recess 330 of the fixed segment and generally at right angles to the recess 380 in the pivoted segment 326.

The pivoted segment 326 is locked in place when in its closed position by means of the latching assembly 384 which can best be seen in FIGURE 11. The latching assembly 384 includes the spring loaded plunger 386 which is received within the bushing 388 mounted within the aperture 390. The plunger 386 is biased towards an extended position by the coil spring 392. When the pivoted segment 326 is positioned in its closed position, the plunger 386 is received within the bushing 394 which is disposed within an appropriate aperture in the disc 300. The plunger 386 in its extended position abuts a push rod 396 which is slidably mounted within the bushing 394. The movement of the push rod 396 is limited by the key and slot assembly 398, as shown in the drawing. When the push rod 396 is pushed inwardly, the plunger 386 is forced in a like direction against the spring 392. When the plunger 386 is moved sufficiently to clear the base plate 314, the pivoted segment 326 is free to rotate about its point of attachment. Since the spring 376 is constantly biasing the pivoted segment 326 toward its open position, the pivotal movement will be automatic upon sufficient depressing of the push rod 396.

Referring now to FIGURES 13 and 14 there is shown a solenoid mechanism for the automatic actuation of the pivoted segments of the tool holding assemblies 302. The solenoids 400 are of a conventional construction and are mounted on the panel 40 in a closely spaced relationship to the tool identification devices 352. The solenoids 400 are adapted to be actuated after the signaling devices 352 have indicated that the proper tool or tool storage assembly 302 is in a predetermined position and the tool is engaged by the arm 200. Upon receipt of such a signal the solenoid is actuated so as to extend the solenoid plunger 402 which is in engagement with the push rod 396. The extension of the solenoid plunger causes the plunger 386 to be unseated, so that the pivoted segment 326 is permitted to be rotated into its open position.

The pivot pin 358 is provided with a projecting end 404 which extends toward the panel 40 as best shown in FIGURE 10. The end 404 is provided with the radially extending arm 406, which is adapted to actuate the micro switch assembly 408. In this manner it is possible to indicate the position of the pivoted segment.

Referring now to FIGURE 15, there is shown a schematic arrangement of the complete matrix assembly, including means for driving the disc 300. The driving means includes a motor 410 of a conventional construction. The motor is coupled to a brake 412 of some suitable type which is adapted to be actuated upon deenergization of the motor 410. Specifically, when the motor 410 is deenergized the brake 412 is energized so as to immediately prevent any further rotation. The brake, in turn, is connected to a gear box 414, which reduces the rotations to a suitable magnitude for driving the disc 300. The gear box 414 is, in turn connected by means of the shaft 418 to the Ferguson drive 416 which is of the same general type as described with reference to the transfer mechanism 34. As was mentioned previously the Ferguson drive is characterized as a worm gear 417 having a variable pitch which is in operative association with a spur gear 419 having a plurality of teeth 419a depending therefrom. The spur gear will normally include some multiple of the number of tool holding assemblies mounted on the disc 300. By means of the variable pitch the rotation of the output shaft 420 is cyclical and ranges between zero and some predetermined maximum r.p.m. The zero portion of the cycle occurs when one of the tool holding assemblies is superimposed on the tool identification assemblies 352. By the momentary lag in the rotation of the disc there is sufficient time for the identification assembly 352 to communicate a signal to determine if the proper storing assembly 302 is in the interchange position. If it is not, the rotation of the disc will be continued until the next tool assembly is in association with the identification assembly. When the proper tool or tool storing assembly 302 is positioned in the interchange position, the master control device upon receiving the signal from the assembly 352 will deenergize the motor 410 and apply the brake 412. In this manner the proper positioning of the matrix 300 is insured.

Referring now to FIGURE 22 there is shown a modication of the matrix generally denoted by the numeral 425. The modification includes a substantially circular disc 426 which is connected by means of the hub 427 and shaft 428 to suitable driving means described previously.

A plurality of tool storing assemblies 429 is mounted on the disc adjacent its periphery in a circumferentially spaced relationship. The tool storing assemblies are adapted to receive a tool holder 91 which is maintained therein by means of the spring loaded latch 430.

Each of the tool holding assemblies 429 is composed of the bars 431, 432 and 433 which are secured to the disc 426. The bars are arranged so as to form a turncated V facing outwardly from the disc 426 and which is adapted to receive the conical base of the tool holder 91. The bars 431 and 433 are undercut as shown in the drawings so as to coincide with the conical base of the tool holder 91. In this manner the tool holder cannot be dislodged in an axial direction from the matrix and the tool storing assembly in which it has been positioned. When a tool holder 91 is positioned within an assembly 429, it is forced into a tangential relationship with the sides of the V by the spring loaded latch 430 as mentioned previously. As a result of the three point engagement of the tool holder base, it is firmly held without danger of being dislodged.

It should be kept in mind that in some instances the bar 432 may be eliminated. This is particularly true where the base of the tool holder does not rest against it but only against the bars 431 and 433.

The included angle between the bars 431 and 433 should be sufficient to permit entry of the tool holder along the arcuate path followed by the arm 200. It is apparent that the included angle will vary in each construction since it is a function of several factors such as the path followed by the arm and the position on the disc circumference in which the transfer between the arm and the matrix is made.

The tool holders may be identified in any suitable manner such as the key arrangement described previously, or with a conventional binary ring assembly 434 as shown in FIGURE 22. In that arrangement a plurality of rings are mounted in a coaxial relationship in which some of the rings are constructed of insulating materials and others of conducting materials. The arrangement of the insulating rings with the conducting rings in any particular assembly corresponds to a given tool and is detected by the sensing element 435. The sensing element 435 includes a plurality of spring fingers which are adapted to contact the rings on the assembly 434 and to generate a signal in a conventional manner.

The latch 430 is actuated by means of a solenoid which is mounted adjacent thereto. When the proper tool has been brought into contact with the sensing element 435 a signal is generated so that the solenoid is actuated. The latch 430 is then moved toward its unlatching position by the solenoid so that the tool positioned within the assembly 429 may be removed by the transfer mechanism.

Referring now to FIGURES 24 and 25 there is shown still another modification of a matrix which may be utilized in the practice of the invention and which is generally denoted by the numeral 475. The modification 475 comprises the hub construction 477 from which depends the radially projecting arm assemblies 478. The hub member 477 is mounted on the shaft 480 to be rotatably driven thereby.

Each of the arm assemblies 478 comprises a base member 482 which projects to form the hub and a tool holding cartridge 484 which is slidably mounted thereon. The cartridge 484 is adapted to be reciprocated on the base member 482 between an extended position as shown in the arm 486 and a retracted position as shown by the remainder of the assemblies 478. Each of the cartridges 484 includes an arcuate slot 488 for receiving the base of a tool holder 91. The arcuate slot 488 conforms to the circular path followed by the rotary arm 200 of the tool transfer mechanism 34. The slot 488 is undercut so as to be complementary to the base of the tool holder 91. In this manner, once the tool holder is positioned within its corresponding cartridge, it may not be axially removed therefrom.

The arcuate slot 488 in each cartridge is defined on one side by the spring biased insert member 489. The springs (not shown) are arranged so as to bias the insert toward the other side of the slot so that a tool holder would be in contact with both sides of the slot 488.

Each slot 488 is also provided with the retaining members 490 which are spring biased at their inner ends so as to define the circular recess 491. The recess 491 is adapted to receive the base of a tool holder 91 so as to prevent inadvertent displacement. When a tool holder 91 is inserted into a slot 488, the associated retainer member 490 is depressed until the base of the holder is fully positioned within the recess. The retainer member then springs back into its normal position. The retainer member 490 may be retracted to permit removal of a tool holder by any suitable means (not shown) such as a solenoid. The solenoid could be positioned so that upon energization it would retract the retainer members to permit removal of a tool holder by the arm 200.

The matrix 475 is positioned so that when the cartridges 484 are in their retracted position there is no interception or interference between it and the rotary arm 200 of the transfer mechanism. When it is desired to interchange the tool between the two, then the appropriate cartridge is moved to the horizontal position on the left and extended, so that the tool carrying assemblies 218 and 220 will coincide with the arcuate slot 488. In this manner a tool may be removed from or deposited in the latter. After the interchange has been completed the cartridge is then retracted and the matrix is again indexed until the appropriate cartridge is in the interchange position.

Although the detailed assemblies for actuating and controlling the position of the cartridges 484 are not shown, it will be apparent that they may take on any one of several forms. For example, the cartridges 484 may be spring biased by a coil spring which is secured at one end to the center portion of the wheel 475 and at the other end to the corresponding cartridge 484. In this manner the spring would normally bias the cartridge into its retracted position. The assembly would then further include some appropriate means for selectively extending the cartridge at the interchange position against the force of the coil spring. Such a device could take the form of a hydraulic or pneumatic jack mounted behind the matrix 475 in which the extendable portion of the jack is in abutting relationship with the cartridge. The extension of the plunger would force the cartridge into its extended position so that the slot 488 was coincident with the tool carrying means 218 and 220 of the arm 200. It will also be apparent that each of the cartridges may be provided with some tool identifying means such as the binary ring assembly 434, or the key assembly 334. The tool identification means would cooperate with some appropriate signal generating means such as that described previously in connection with the key assembly or binary ring assembly.

Electrical circuitry

Referring now to FIGURE 21 there is shown a schematic illustration of the electrical circuitry used in the construction of the tool changer. This illustration is merely for exemplary purposes and it will be apparent that other arrangements may be used where desired. As mentioned previously, the tool changer includes a data reading device 450 and a controller 452, which may be of a conventional construction. The data reading device 450 may be of any suitable type such as those which utilize a punched card in which the perforations are representative of certain information used for generating predetermined signals. The reading device communicates these signals to the controller 452 which, in turn, is connected to the various components of the tool changer, as will be described hereinafter.

The controller 452 is connected to the motor 63 for driving the chuck 32 through the relay 454 which is adapted to connect and disconnect the motor 63 from a suitable source of electrical energy. The controller 452 is also connected to the chuck through the signal switch 170 to indicate to the former whether it is opened or closed, as described previously.

The controller 452 is connected to the motor 280 and brake 282 of the transfer mechanism though the relay 456 for selectively connecting and disconnecting them to a source of electrical energy. The position of the transfer mechanism 34 is communicated to the controller 452 by means of the position indicator switch 290 connected to the Ferguson drive 286, as shown in FIGURE 2. The controller 452 is also connected to the various mirco-switches 266, 270 and 274 in the arm 300 to indicate the positions of the jaws, the solenoids for actuating the same, and the presence or absence of a tool holder within the tool holding assemblies 218 and 220. The solenoids 230 are selectively energized by the controller to open and close the jaws of the tool carrying means 218 and 220, as was mentioned previously.

The controller 452 is connected to the motor 410 and brake 412 through the relay 458 for selectively connecting and disconnecting them to a suitable source of electrical energy. By suitable connections with the reading device 352 and the switch 408, the position of the matrix 36 and the condition of a tool holding assembly positioned in the pick-up position are relayed to the controller 452. The solenoid 400 for opening the segment 326 is selectively actuated by the controller.

As a result of this arrangement the controller serves to coordinate the operation of the various components of the matrix in their proper sequence, which will be described later on. The controller further serves to disseminate the information from the reader 450 to the components of the machine tool so that they carry out their desired functions.

Operation

Referring now to FIGURES 16 through 19, there is shown a schematic illustration of the operation of one form of the tool changing system. In these figures, simplified diagrammatic representations of the chuck 32, transfer mechanism 34 and matrix 36 are shown. For purposes of convenience the tool carrying means A and B in the transfer mechanism 34 will be referred to as recesses A and B and the transfer mechanism as arm 200 throughout this section.

In this modification the arm is adapted to pick up and deposit tools from the matrix at points above and below their horizontal diameter as shown in FIGURES 16 and 17, so that it is not necessary for the arm to make a complete revolution as in the modification shown in FIGURES 20(a) through 20(h). As can be seen from FIGURE 19 the arm moves in both the clockwise and counterclockwise directions to accomplish the transfer operation.

FIGURE 18 comprises a chart showing the various steps through which the arm moves in carrying out its function and the condition of each component during the respective steps.

At the start of a cycle the arm 200 is in the vertical or No. 1 position shown in FIGURE 16. In the first step the arm 200 moves in the clockwise direction to the position indicated by the dotted lines so that recess B receives the tool from the matrix 36. Prior to engagement by the arm, the matrix has been properly indexed so that the proper tool is in the transfer position. Upon engagement with the tool, the recess B is closed and the matrix is opened so as to release the tool therefrom and to permit the arm to swing back to position No. 1 ready to transfer the tool to the chuck 32. As soon as the current operation in the chuck is completed the arm is then rotated to position No. 2 whereby recess A engages the tool in the chuck. Upon engagement recess A is closed and the chuck is opened to permit the release of the tool so that it may be removed by the arm. After the chuck is opened the arm is then pivoted in the counterclockwise direction to position No. 3, whereby the tool within recess B is coincident with the chuck 32, at which time the chuck is closed so as to grasp the tool and recess B is opened. The arm is then rotated to position No. 4 where it is positioned while the matrix 36 is being indexed until the proper tool holding assembly is presented at position No. 5. The arm 200 is then further rotated to position No. 5 so that the tool in recess A is engaged in the proper tool storing assembly and is released from the arm. After the transfer has been completed the arm is then rotated clockwise to position No. 4 as shown in FIGURE 17, so that the matrix may again be indexed until the proper tool for the next machining operation is presented at position No. 5. The arm again is rotated counterclockwise until recess A engages the tool in the corresponding position of the matrix, at which time the arm is rotated back to position No. 4 to a ready position for the next machining operation. After the current machining operation has been completed the arm is rotated to position No. 3 whereby recess B engages the tool previously placed in the chuck. As soon as the transfer has been completed the arm is then rotated to position No. 2, whereby the tool in recess A is transferred to the chuck. The arm is then rotated into position No. 1 at which time the matrix is indexed until the tool storage means corresponding to the previously used tool is presented at station No. 6. The cycle is completed by rotating the arm in the clockwise direction until the previously used tool in recess B is transferred to the corresponding tool storing assembly on the matrix and then rotated back to position No. 1 ready for the next operation.

Referring now to FIGURES 20(a) through 20(h), there is shown a second embodiment in which the arm is adapted to pick up or deposit the tool at a position along the horizontal diameter of the matrix. In order that the arm may make a full revolution the machine tool must include some means (not shown) for translating the matrix with respect to the arm in order to prevent interference therebetween.

In FIGURE 20(a) the arm 200 is shown in its starting position which is vertical with respect to the chuck 32 and the matrix 36. The transfer mechanism 34 as was mentioned previously includes two tool carrying means which are designated recesses A and B for the purpose of this description. In the starting position both of the recesses A and B are opened. The chuck at that particular position is in the closed position with the matrix being indexed so that the proper tool is positioned at the pick-up position C. At the same time the matrix 36 is translated from its clearance position to a position where C lies in the path of recess B. When the indexing is complete, the arm is then rotated in a clockwise direction until the recess B engages the tool at position C, at which time recess B is closed and the matrix is opened to release the tool. The arm is then rotated until recess A engages the tool previously positioned within the chuck 32. Upon engagement the tool carrying means A is closed and the chuck is opened so that the tool is released. The next step as shown in FIGURE 20(d) comprises rotating the arm 200 until the tool in recess B is aligned with the chuck 32, at which time it is actuated so as to engage the tool in recess B and the latter is opened to release the tool.

In the next step the arm 200 is rotated in the clockwise direction as shown in FIGURE 20(e), with the matrix 36 being indexed at the same time so that the proper storage assembly is moved into position C, so that it may receive the tool removed from the chuck 32. When the tool has been received in the matrix the latter is then closed and the recess A is opened so as to release the tool. As soon as the transfer has been completed the arm is then rotated one step in a counterclockwise direction as shown in FIGURES 20(f) and (g) to permit the matrix 36 to be translated so that the arm may swing past it. The matrix is then translated back and rotated until the next tool is positioned at C. The next steps comprise rotating the arm until the tool at C is received within recess B and then further rotating the arm to its starting position ready for the next cycle, as shown in FIGURE 20(h).

As a result of this invention it can be seen that the transfer of the tools between the matrix and the chuck may be carried out in a single plane, thus eliminating the necessity of utilizing means for moving the arm or the matrix or the chuck in a plurality of planes in order to effect the transfer. It is also possible as a result of the unique arm construction to substantially minimize the amount of time necessary for accomplishing the transfer operation. Specifically, by arranging the tool carrying assemblies (recesses A and B) in opposing relationship it is possible to remove the old tool and to transfer the new tool in a single rotation of the arm. Furthermore, the indexing of the matrix and the rotation of the arm for the selection of the new tool and the deposition of the old tool is carried out during the machining operation so that the arm is in a ready position at the end thereof. In this manner a minimum of idle time is consumed by the interchange of tools in the chuck.

Although certain specific embodiments of the invention have been disclosed herein it is to be understood that these are merely by way of example and in no manner to be considered as limitations. It will be apparent that certain modifications may be made within the scope of the claims without departing from the spirit of the invention.

It is claimed:

1. In a machine tool system having a matrix for storing a plurality of tools, and a chuck for holding one of said tools, a tool transfer mechanism comprising an arm rotatably mounted for rotation about a point whereby said arm may be selectively brought into association with the chuck and the matrix for transferring a tool between the two, said arm including first and second tool carrying means arranged in closely spaced circumferentially opposing relationship in which the first tool carrying means engages a tool held in the chuck and deposits the same in the matrix and the second tool carrying means engages a tool held in the matrix and deposits it in the chuck, when the arm is rotated in one direction.

2. A transfer mechanism for conveying an object between first and second predetermined points comprising an arm mounted at one end for rotation whereby said arm may be selectively brought into association with said first and second points, said arm including first and second carrying means arranged in circumferentially opposing relationship at its other end in which said first carrying means engages an object at said first point and deposits the same at said second point and said second carrying means engages an object at said second point and desposits it at said first point upon rotation of the arm in one direction, each of said carrying means being composed of a recess extending in the plane of rotation adapted to at least partially circumscribe one of said objects.

3. In combination, a work station, tool storage means having a plurality of tool holding means, and tool transfer means comprising a pivotally mounted arm having first and second tool carrying means disposed at one end of said arm on opposite sides of the longitudinal axis thereof so as to face in opposite directions and arranged to acquire tools by movement in said opposite directions, the arcuate path of movement of said tool carrying means extending from one transfer position of said tool storage means to receive a tool therefrom and then to and past the work station to a second transfer position of said tool storage means to deliver a tool thereto, each of said tool carrying means comprising a fixed clamping member and a movable clamping member.

4. The combination of claim 3 wherein the tool storage means is rotatable and its tool holding means are disposed in a circle in spaced relation so as to present a tool holding means at each end of said arcuate path of the arm whenever the tool storage means is rotated by increments corresponding to the spacing.

5. The combination of claim 4 wherein the work station includes a chuck having a flat planar locating face for a tool, each of said tool holding means having a flat planar locating face for a tool, and all of said locating faces being in the same plane.

6. The combination of claim 5 wherein the arm is also mounted for limited axial movement along its pivot axis and each of the tool holding means includes an inclined camming surface adapted to engage and thereby cam a tool carried in said arm and the arm itself toward the plane of said locating faces.

7. Tool transfer means for transferring a tool between a matrix, which is adapted to store at least one tool, and a chuck, which is adapted to hold a tool, said tool transfer means comprising a pivotally supported arm, a pair of tool carrying means on said arm adjacent one end thereof, each tool carrying means comprising a tool grasping means adapted in closed position to grasp a tool, the tool grasping means of the pair of tool carrying means facing in opposite directions circumferentially, said tool grasping means comprising fixed clamping means and pivotally mounted clamping means on said arm, said fixed and movable clamping means, when said tool grasping means is in its closed position, encompassing more than 180° of the periphery of a portion of the tool which is grasped, rigid latching means associated respectively with each of said tool grasping means for maintaining said tool grasping means in closed position, and means for independently releasing said latching means, said latching means comprising a pivotally mounted arm normally biased toward latching position and having a beveled surface engageable with the movable clamping means in the closed position of said movable clamping means.

8. A tool transfer means of claim 7 together with biasing means for the movable clamping means normally biasing it toward open position.

9. The combination of claim 1 in which said arm is rotatable in both the clockwise and counter-clockwise directions so that the relationship of said first and second tool carrying means with respect to the matrix and the chuck is reversed by reversing the direction of rotation.

10. The combination of claim 9 wherein each of said tool carrying means is composed of a recess extending in the plane of rotation adapted to partially circumscribe a tool, a pivoted member for selectively locking a tool therein and a signal generating means for opening and closing said pivoted member.

References Cited by the Examiner
UNITED STATES PATENTS

| | | | |
|---|---|---|---|
| 2,363,208 | 11/1944 | Sulzer | 29—26 |
| 2,748,864 | 6/1956 | Ewaldson | 29—26 |
| 2,783,664 | 3/1957 | Johnson | 29—26 |
| 2,952,170 | 9/1960 | Hansen | 29—26 |

FOREIGN PATENTS

| | | |
|---|---|---|
| 1,236,668 | 6/1960 | France. |
| 1,242,438 | 8/1960 | France. |

OTHER REFERENCES

Publication: Kearney and Trecker Manual WS–59. (Received in Division 13, December 1959.)

RICHARD H. EANES, Jr., *Primary Examiner.*